United States Patent
Yamada et al.

[19]

[11] Patent Number: 6,104,186
[45] Date of Patent: Aug. 15, 2000

[54] ROTATION DETECTOR USING MAGNETORESISTANCE ELEMENT POSITIONED IN VICINITY OF OUTER PERIPHERAL EDGE OF TOOTHED GEAR

[75] Inventors: Toshitaka Yamada, Okazaki; Seiki Aoyama, Toyohashi; Hirofumi Uenoyama, Nishikasugai-gun, all of Japan

[73] Assignee: Denso Corporation, Japan

[21] Appl. No.: 09/057,495

[22] Filed: Apr. 9, 1998

[30] Foreign Application Priority Data

Apr. 18, 1997 [JP] Japan ..................... 9-101945

[51] Int. Cl.[7] .............. G01R 33/06; G01B 7/30
[52] U.S. Cl. ............... 324/207.21; 324/207.25; 324/174
[58] Field of Search .......... 324/207.21, 207.24, 324/207.25, 252, 166, 173, 174, 207.22, 207.23; 338/32 R, 32 H

[56] References Cited

U.S. PATENT DOCUMENTS

| | | | |
|---|---|---|---|
| 4,506,217 | 3/1985 | Rothley et al. ................. | 324/252 |
| 4,677,377 | 6/1987 | Takahashi et al. ............. | 324/207.21 |
| 5,041,785 | 8/1991 | Bogaerts et al. .............. | 324/207.24 |
| 5,134,371 | 7/1992 | Watanabe et al. ............. | 324/252 |
| 5,359,287 | 10/1994 | Watanabe ..................... | 324/207.21 |
| 5,477,143 | 12/1995 | Wu ............................. | 324/207.21 |
| 5,493,219 | 2/1996 | Makino et al. ................ | 324/207.25 |
| 5,637,995 | 6/1997 | Izawa et al. .................. | 324/174 |
| 5,644,226 | 7/1997 | Aoyama et al. ............... | 324/207.21 |

*Primary Examiner*—Jay Patidar
*Attorney, Agent, or Firm*—Nixon & Vanderhye PC

[57] ABSTRACT

A magnetoresistance element detects an angular position of a toothed gear rotated by an engine. The element (first element) is positioned at a vicinity of the peripheral edge of the gear tooth in a magnetic filed supplied from a bias magnet. The magnetic field direction is changed by the tooth, which is detected by the element even when the gear is not rotated before the engine starts. To detect an exact angle of the gear, an additional magnetoresistance element positioned perpendicularly to the first element may be used. The gear tooth position is detected by the first element even when the gear is not rotated, and once the gear rotates, the second element detects an exact angular position of the gear.

9 Claims, 7 Drawing Sheets

ROTATION DETECTOR USING MAGNETORESISTANCE ELEMENT POSITIONED IN VICINITY OF OUTER PERIPHERAL EDGE OF TOOTHED GEAR

CROSS-REFERENCE TO RELATED APPLICATION

This application is based upon and claims benefit of priority of Japanese Patent Application No. Hei-9-101945 filed on Apr. 18, 1997, the content of which is incorporated herein by reference.

BACKGROUND OF THE INVENTION

1. Field of the Invention

The present invention relates to a rotation detector using a magnetoresistance element, and more particularly to such a detector suitable for an engine control system for detecting the rotational angle and speed of an internal combustion engine.

2. Description of Related Art

The timing for igniting fuel in an internal combustion engine (spark timing) is usually determined based on information of a crank angle and a cam angle. In a four-cycle engine, for example, information for determining a cylinder to be ignited is obtained from one rotation of the cam, and information for determining the spark timing is obtained from a crank rotation, because the cam makes one rotation while the crank makes two rotations.

An example of a rotation detector of this kind is disclosed in JP-A-3-195970. A bias magnet is disposed at a vicinity of the outer periphery of a cam gear having gear teeth and gear bases formed alternately thereon. The bias magnet generates a magnetic field directing to the cam gear. A magnetoresistance element (referred to as MRE hereafter) is disposed in the magnetic field between the cam gear and the bias magnet. The MRE detects the rotation of the cam gear from magnetic field alternation caused by rotation of the cam gear.

The rotation detector disclosed in this publication cannot detect whether the MRE faces a tooth of the cam gear or a gear base (a space between two neighboring teeth), when the cam gear is not yet rotated by the engine after the detector is switched on. In other words, the angular position of the cam gear cannot be detected during a short period before the engine starts. The reason for this will be explained, referring to FIGS. 11A and 11B. FIG. 11A shows a situation where a gear base of cam gear 101 faces MRE 103, and FIG. 11B shows another situation where a tooth of cam gear 101 faces MRE 103. Bias go magnet 102 generates a magnetic field directing to cam gear 101 having teeth 101a and gear bases alternately formed thereon. MRE 103 is placed in the magnetic field between cam gear 101 and bias magnet 102. Gear tooth 101a has side surfaces 101b at both sides thereof. The direction of the magnetic field is shown by arrows. Since the magnetic field direction is substantially the same in both situations as shown in FIGS. 11A and 11B, MRE 103 cannot detect the cam gear angle when cam gear 101 is not rotating. Once cam gear 101 rotates, MRE 103 generates signals shown in FIG. 12, in which an upper graph shows the signal when cam gear 101 begins to rotates from the position shown in FIG. 11A, and a lower graph shows the signal when cam gear 101 begins to rotate from the position shown in FIG. 11B. In the upper graph, MRE 103 generates signal U when it meets a first side surface 101b, and signal V when it meets with the next side surface 101b. In the lower graph, signal V is first generated and then signal U is generated. This means that the signals generated in period T from switching-on of the detector to a time MRE 103 first meets side surface 101b are the same in both situations shown in FIGS. 11A and 11B. Therefore, the cam gear angle cannot be detected in period T. Accordingly, a cylinder to be first ignited cannot be determined, and the first cylinder is not fired at a very beginning of the engine start.

SUMMARY OF THE INVENTION

The present invention has been made in view of the above-mentioned problem, and an object of the present invention is to provide a rotation detector using a magnetoresistance element which detects an angular position of a toothed gear even when the gear is not rotating.

The angular position of the gear made of a magnetic material such as iron is detected by a magnetoresistance element which senses change of the direction of a magnetic field in which the element is positioned. The gear has plural gear teeth and gear bases alternately formed on the outer periphery of the gear. A bias magnet is placed to a vicinity of the gear to generate a magnetic field directing toward the gear. An elongate magnetoresistance element (first element) is positioned in the magnetic field at the vicinity of the gear teeth in parallel to the outer peripheral edge of the gear teeth. Electric current flowing in the longitudinal direction is supplied to the element. Since the magnetic field direction is changed by the gear tooth, the element detects whether it faces the gear tooth or the gear base even when the gear is not rotated. The magnetoresistance element may be placed at a side of the gear or at a radial outside of the gear, as long as it is positioned at a vicinity of the peripheral edge of the tooth or the gear base.

Another magnetoresistance element (second element) may be used in addition to the first element to exactly detect a transitional position from the gear tooth to the gear base. The second element is positioned perpendicularly to the first element. The first element detects the position of the gear tooth even when the gear is not rotated, and the second element exactly detects the transitional position of the gear tooth once the gear starts to rotate. Accordingly, an engine cylinder to be first ignited is determined at an engine starting, thereby avoiding a misfiring.

The signals form the first and second magnetoresistance elements are processed by a signal processing circuit connected to the elements. In the signal processing circuit, the signal from the second element is used as a timing signal for sampling the signal from the first element. Thus, the angular position of the toothed gear is exactly detected.

Other objects and features of the present invention will become more readily apparent from a better understanding of the preferred embodiments described below with reference to the following drawings.

DETAILED DESCRIPTION OF THE PREFERRED EMBODIMENTS

Referring to FIGS. 1 to 6, a rotation detector as a first embodiment according to the present invention will be described. This embodiment is designed as a rotation detector for detecting crank angles of an internal combustion engine.

Figure 1:
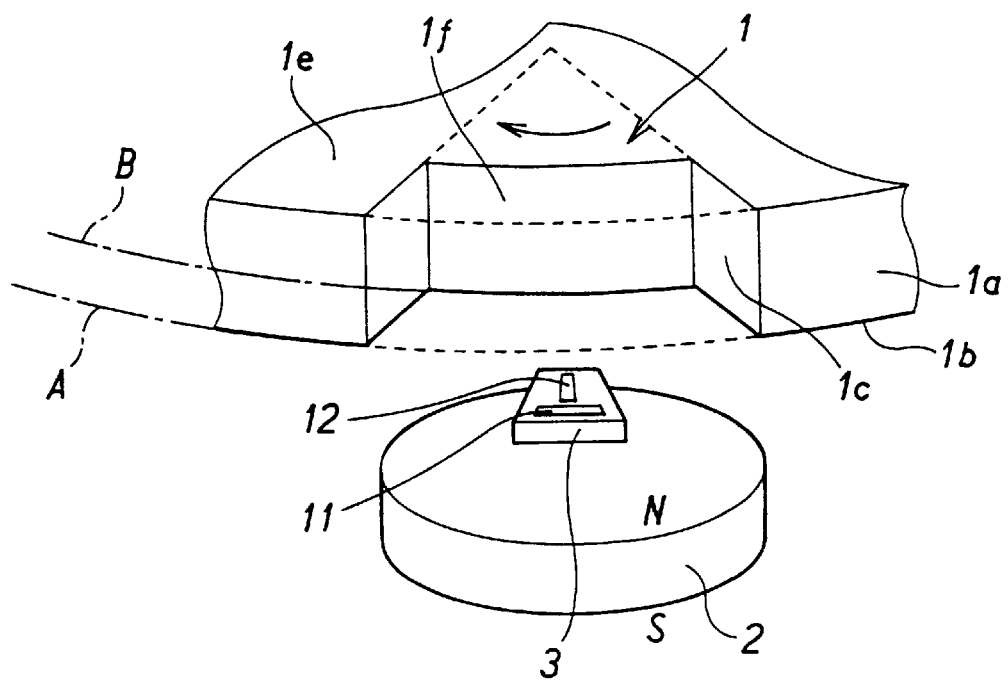
FIG. 1 is a perspective view schematically showing a rotation detector as a first embodiment according to the present invention.
Figure 2A:
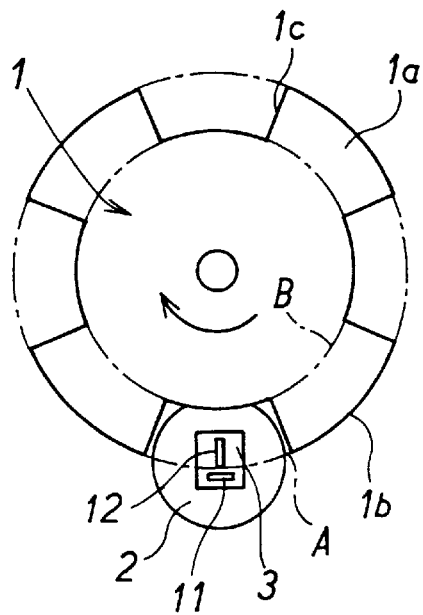
FIG. 2A is a plan view showing the rotation detector shown in FIG. 1.
Figure 2B:
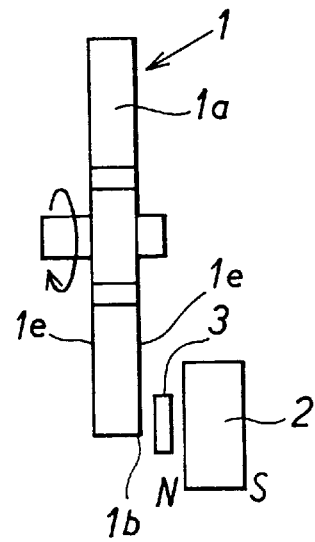
FIG. 2B is a side view showing the rotation detector shown in FIG. 1.

The structure of the detector is shown is FIGS. 1, 2A and 2B. The rotational detector is composed of a gear 1 driven by an engine in the direction shown by an arrow, bias magnet 2 disposed at one side of gear 1 and integrated circuit chip (IC chip) 3 interposed between gear 1 and bias magnet 2. Outputs from IC chip is processed by a signal processing circuit shown in FIG. 5. Gear 1 made of a magnetic material such as iron has both side surfaces 1e and plural gear teeth 1a formed on the outer periphery of gear 1 at equal intervals. Between gear teeth 1a, there are gear bases 1f. Outer circle A is a circle corresponding to the outer peripheral surfaces of gear teeth 1a, and inner circle B is a circle corresponding to the surfaces of gear bases 1f. Each gear tooth 1a has both tooth side surfaces 1c and peripheral edge 1b between both tooth side surfaces 1c. Bias magnet 2 is disposed at one axial side of gear 1 with a certain air gap as shown in FIG. 2B. An N pole of bias magnet 2 is disposed to face gear 1 and an S pole thereof at an opposite side, so that magnetic field generated by bias magnet 2 directs substantially perpendicularly to side surface 1e of gear 1.

IC chip 3 is disposed between gear 1 and bias magnet 2. IC chip 3 includes a first magnetoresistance element (MRE) 11 and second magnetoresistance element (MRE) 12. Electric current is supplied to both MREs 11, 12 from a power source not shown in the drawings, and signals from them are taken out from terminals not shown in the drawings. First MRE 11 is located just outside of outer circle A and in parallel thereto as shown in FIG. 2A, so that it detects a magnetic field at peripheral edge 1b of gear 1. Electric current in first MRE 11 flows in the longitudinal direction thereof, that is, the parallel direction to circle A. Second MRE 12 is located between outer circle A and inner circle B and in the radial direction of gear 1 which is perpendicular to first MRE 11, as shown in FIG. 2A, so that second MRE 12 detects magnetic field changes when tooth side surface 1c of gear 1 passes therethrough. Electric current in second MRE 12 flows in the longitudinal direction thereof, that is, the perpendicular direction to circle A. Bias magnet 2 and IC chip 3 having both MREs 11, 12 are molded together by a resin material in this particular embodiment.

Figures 3A, 3B, 3C:
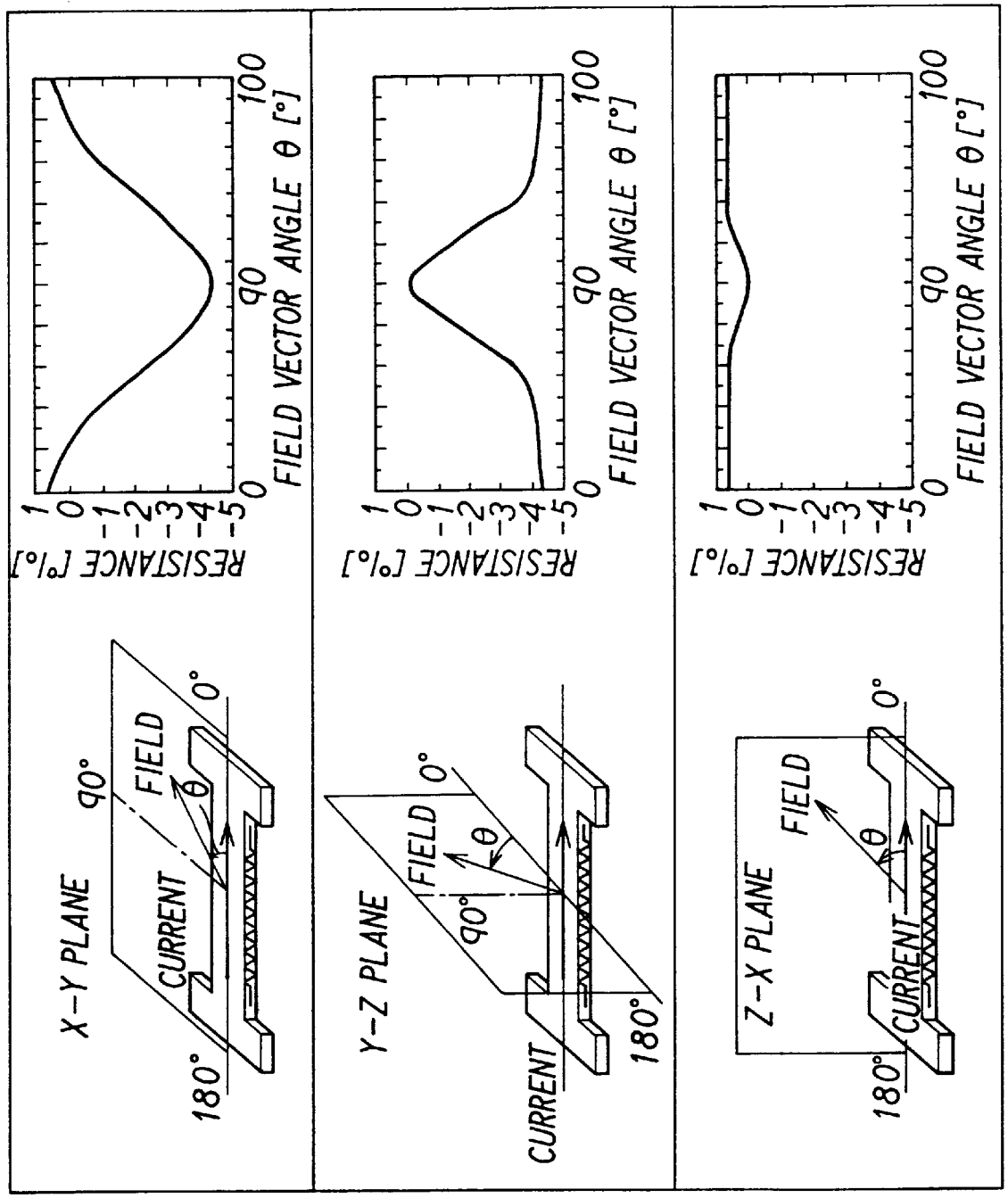
FIGS. 3A to 3C are charts showing general properties of a magnetoresistance element used in the rotation detector of the present invention.

General properties of an MRE are shown in FIGS. 3A, 3B and 3C. In FIG. 3A, an elongate MRE is placed on an X-Y plane, and a current in the MRE flows in the X-direction. A direction of magnetic field makes an angle θ with respect to the X-axis. A graph in FIG. 3A shows an electric resistance change in the MRE in terms of percent versus the angle θ of a magnetic field vector. As seen in the graph, the MRE electric resistance shows a maximum decrease when θ is 90-degree. In FIG. 3B, a magnetic field angle θ is measured on a Y-Z plane which is perpendicular to the direction of current in the MRE placed on the X-Y plane. The MRE resistance versus the magnetic field angle 6 is shown in a graph in FIG. 3B. As seen in the graph, the resistance decrease at a field angle 90-degree is the smallest. In FIG. 3C, the magnetic filed direction θ is measured on a Z-X plane which is perpendicular to both planes X-Y and Y-Z. The MRE resistance change is small, compared with those in other planes.

Figure 4:
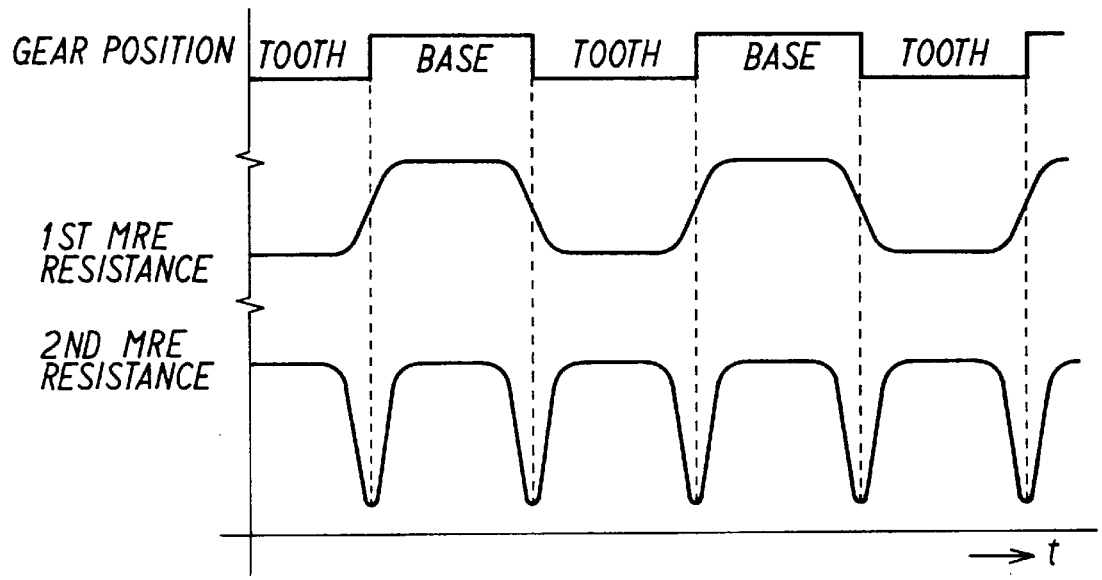
FIG. 4 is a time chart showing values of electric resistance of the magnetoresistance elements in the detector shown in FIG. 1.

Since the magnetic field in the first embodiment is substantially perpendicular to the plane on which both MREs 11 and 12 are placed, and the magnetic field direction influence on the MRE resistance in the Z-X plane is small, the MRE resistance varies predominantly according to the magnetic field angle θ on the Y-Z plane. FIG. 4 shows the MRE resistance at various gear positions which vary according to the rotation of gear 1. The first graph (the uppermost graph) shows the gear positions (gear teeth 1a and gear bases If alternate as gear 1 rotates) relative to the MREs. The second graph (the middle graph) shows the resistance in first MRE 11, and the third graph (the lowermost graph) shows the resistance in second MRE 12. As to the first MRE resistance, the resistance becomes a high level when first MRE 11 faces gear base 1f, because the magnetic field direction through first MRE 11 is not bent (there is no magnetic material in its path and its direction θ on the Y-Z plane is 90-degree). On the other hand, the resistance becomes a low level when first MRE 11 faces gear tooth 1a, because the magnetic field direction is bent toward peripheral edge 1b of gear tooth 1a (its direction 6 on the Y-Z plane becomes less than 90-degree). During a transient period from gear tooth 1a to gear base 1f or from gear base 1f to gear tooth 1a, the MRE resistance varies slowly. As to the second MRE resistance, the resistance becomes a high level when second MRE 12 faces both gear base 1f and gear tooth 1a, because the magnetic field through second MRE 12 is not bent in both positions (there is no magnetic material in its path when second MRE 12 faces gear base 1f, and second MRE 12 is covered by gear tooth 1a when it faces gear tooth 1a). When tooth side surface 1c passes through second MRE 12, the magnetic field direction θ on the Y-Z plane is momentarily bent by tooth side surface 1c of gear tooth 1a. Accordingly, the second MRE resistance becomes low at this instance.

In the manner described above, the gear positions (gear tooth 1a and gear base 1f) are detected by first MRE 11, even when gear 1 is not rotating, and the position of tooth side surface 1c is exactly detected by second MRE 12 using the rapid resistance change which is caused when tooth side surface 1c passes through second MRE 12. In other words, the gear position is detected by first MRE 11 right after a detector switch is turned on, when the engine is not yet started. The transient position of gear 1 (from tooth 1a to base 1f or vice versa) is exactly detected by second MRE 12 once the engine is started. Therefore, the first cylinder to be fired can be determined without fail at the very beginning of an engine starting, and, accordingly, not only the engine can be smoothly started but also air pollution caused by mis-fire of the first cylinder is avoided.

Figure 5:
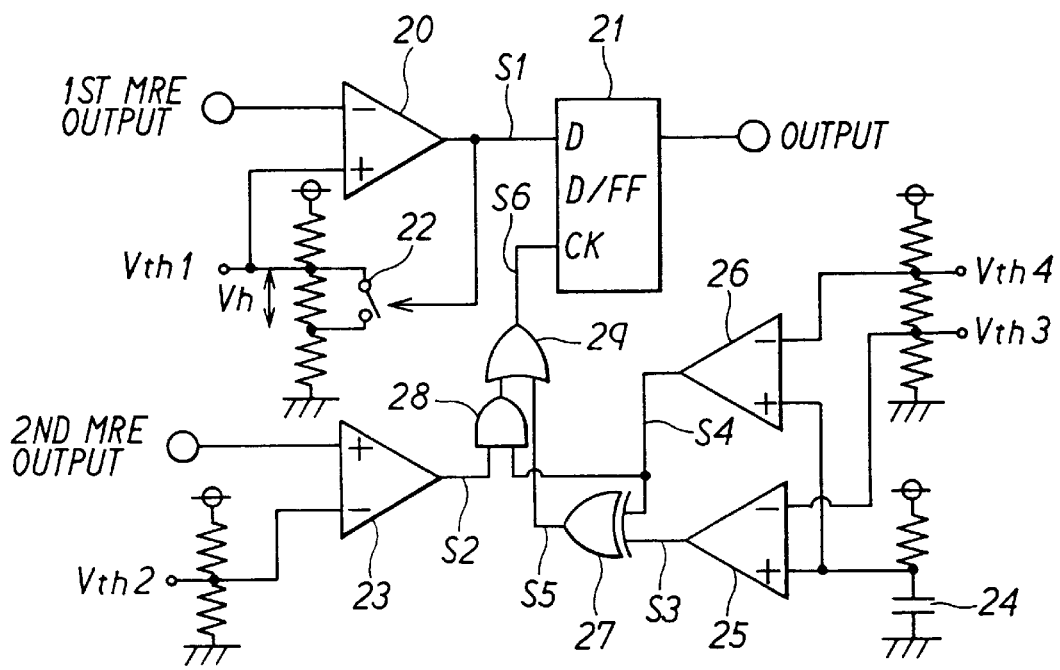
FIG. 5 is a diagram showing a signal processing circuit used in the rotation detector according to the present invention.
Figure 6:
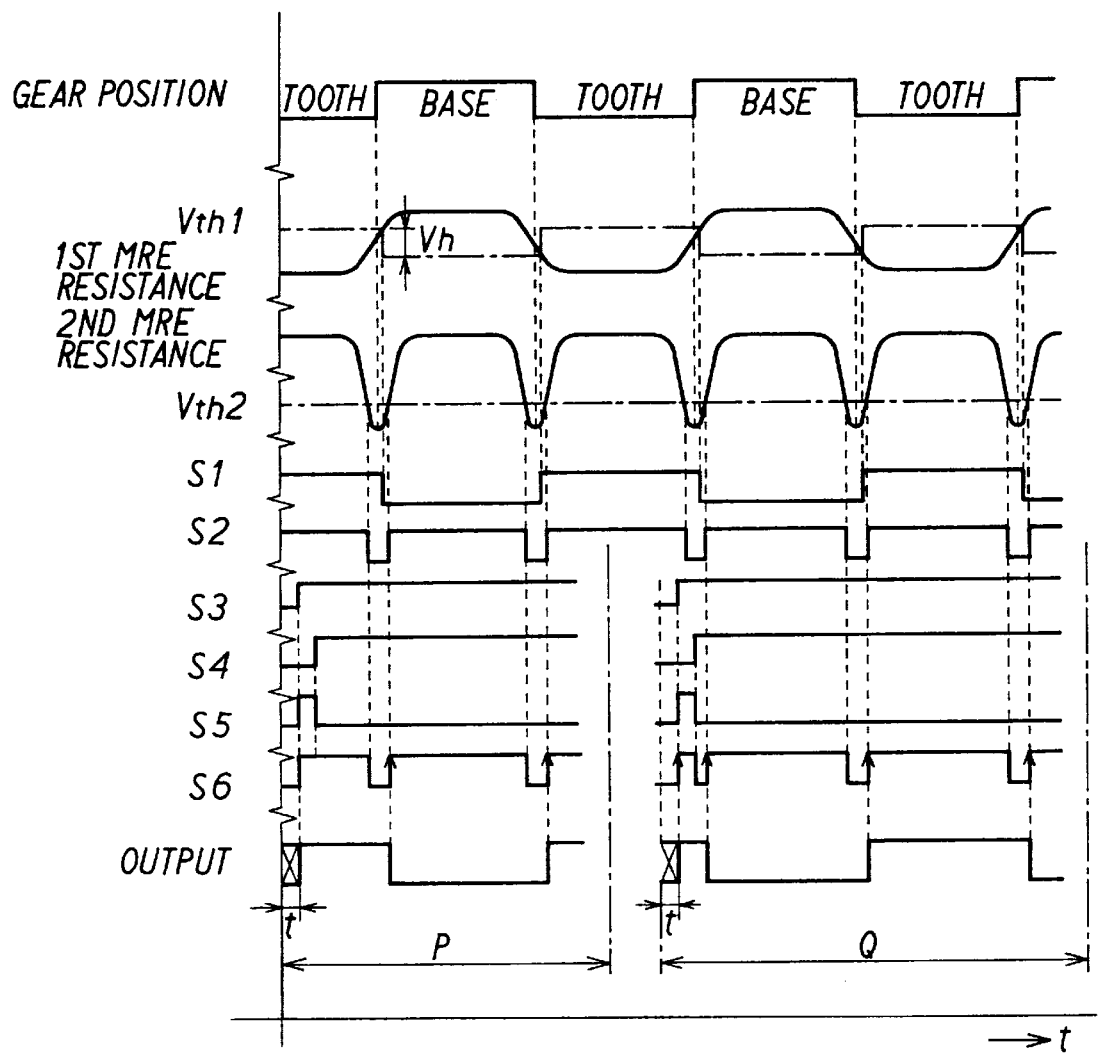
FIG. 6 is a graph showing waveforms at various positions in the signal processing circuit shown in FIG. 5.

A circuit for processing signals from first and second MREs 11, 12 is shown in FIG. 5. Waveforms at various points in the signal processing circuit is shown in FIG. 6. FIG. 6 also includes waveforms when MREs 11, 12 face peripheral edge 1b of gear tooth 1a before an engine starts at the bottom left (designated by P), and waveforms when MREs 11, 12 face a vicinity of tooth side surface 1c of gear tooth 1a before an engine starts at the bottom right (designated by Q).

The output of first MRE 11 is compared with a predetermined threshold voltage Vth1 in comparator 20. Comparator 20 outputs signal S1 as a result of the comparison which in turn is input to D-type flip-flop (D-flip-flop) 21. Once the signal from MRE 11 becomes higher than threshold voltage Vth1 and comparator 20 outputs a low level signal, switch 22 is turned on and makes threshold voltage Vth1 decrease by Vth to avoid chattering. In other words, a certain hysteresis is given to the comparator circuit. Comparator 23 compares the output from second MRE 12 with another predetermined threshold voltage Vth2. Comparator 23 outputs signal S2 based on the comparison. Signal S2 is input to D-flip-flop 21 as its clock signal. D-flip-flop 21 performs sampling of the output signal of MRE 11 using a change of signal S2 as a timing signal.

On the other hand, a circuit for avoiding a possible situation where an output signal of D-flip-flop 21 does not accord with signal S1. Condenser 24 is charged together with an engine start, and comparators 25, 26 compare the charged voltage of condenser 24 with threshold voltages Vth3 and Vth4, respectively. Based on the comparison, comparators 25 and 26 output signals S3 and S4, respectively. Once the condenser voltage becomes higher than Vth3 or Vth4, signal S3 or S4 becomes a high level, respectively, and keeps that level thereafter, as shown in FIG. 6. Signals S3 and S4 are fed to exclusive OR circuit (EXOR) 27, and EXOR 27 in turn outputs signal S5. Signals S2 and S4 are fed to AND circuit 28. An output of AND circuit 28 and signal S5 are fed to OR circuit 29 which in turn outputs signal S6. Signal S6 is fed to D-flip-flop 21 as a clock signal. When a level of clock signal S6 is switched from a low level to a high level (shown by upward arrows in FIG. 6), the level of the output signal of D-flip-flop is reversed. In other words, mis-matching of signal S1 and the output signal of D-flip-flop 21 at an engine starting is avoided, and the level of the output signal of D-flip-flop 21 is reversed at a rising edge of signal S2 which depends on the output of second MRE 12. Though signals S3, S4 and S5 are not necessary during one rotation of gear 1, they are used to avoid a possible situation, where signal S1 depending on the output of first MRE 11 does not accord with the output of D-flip-flop 21, which may occur at a starting of operation before a first side surface 1c of tooth 1a passes through the position of MREs. Thus, the output signal of D-flip-flop 21 is compulsorily accorded with signal S1 which is based on the output of first MRE 11, and accordingly the angle of gear 1 (whether MREs face gear tooth 1a or gear base 1f) is exactly detected by the rotation detector at the very beginning of the gear rotation. Though the gear angle is not exactly detected during a short period of time t (shown in the bottom graph of FIG. 6) in which the D-flip-flop output and signal S1 are compulsorily accorded, there occurs no problem at all because time t is very short.

Second MRE 12 is used in the first embodiment to detect the gear angle more accurately, it is possible to detect the gear angle only by first MRE 11.

Figure 7A:
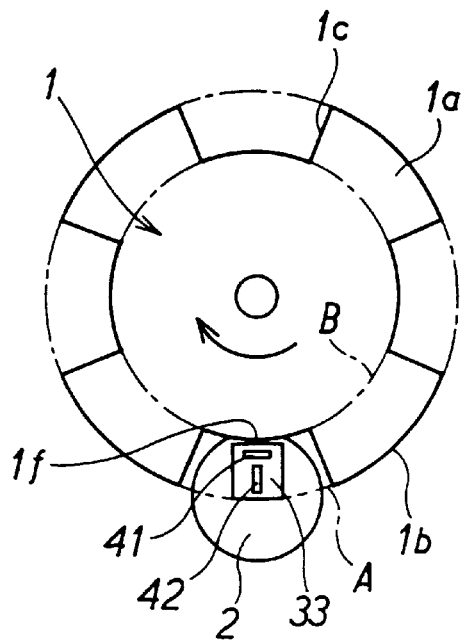
FIG. 7A is a plan view showing a rotation detector as a second embodiment according to the present invention.
Figure 7B:
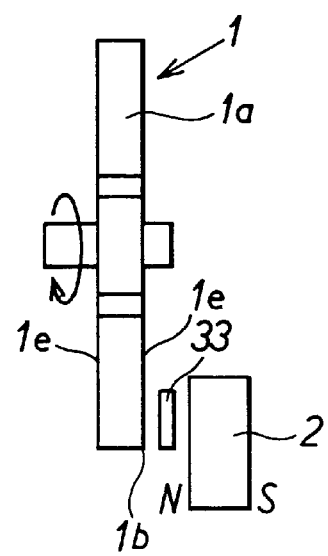
FIG. 7B is a side view showing the rotation detector shown in FIG. 7A.
Figure 8:
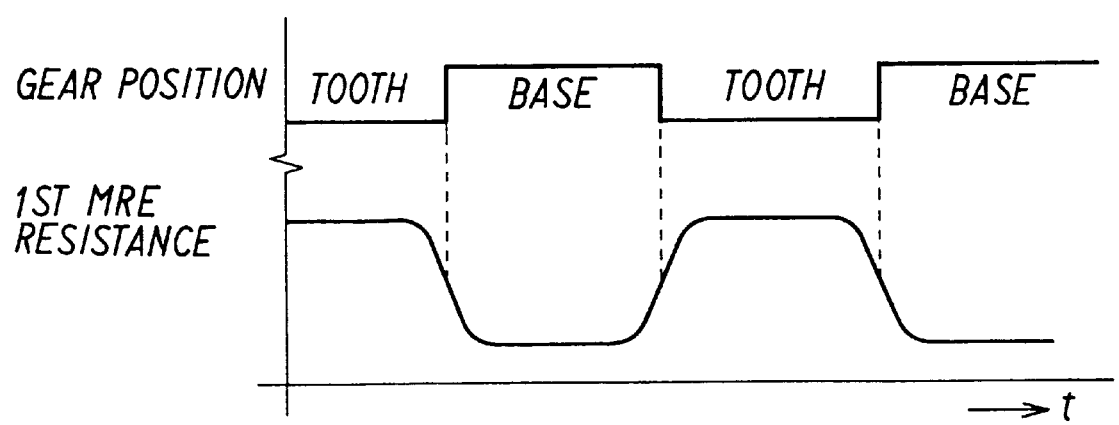
FIG. 8 is a time chart showing a value of electric resistance of a magnetoresistance element used in the second embodiment.

Referring to FIGS. 7A, 7B and 8, a rotation detector as a second embodiment according to the present invention will be described. FIG. 7A shows a plan view of the second embodiment, FIG. 7B a side view, and FIG. 8 a time chart of an MRE resistance. Since the structure of this embodiment is the same as that of the first embodiment except for IC chip 33, the same components or parts are numbered with the same reference numerals as in the first embodiment, and the explanation of those are not repeated here. On IC chip 33, first MRE 41 and second MRE 42 are mounted. Second MRE 42 is positioned in the same manner as in the first embodiment, but first MRE 41 is positioned differently. That is, first MRE 41 is positioned just outside of inner circle B (an outer vicinity of inner circle B) and in parallel to inner circle B. The electric current flows in the longitudinal direction in both MREs.

As shown in FIG. 8, the electric resistance of first MRE 41 varies with a phase opposite to that of the first embodiment, because the magnetic field going through first MRE 41 is bent on the Y-Z plane (refer to FIG. 3A) when first MRE 41 faces gear base 1f, while it is not bent when first MRE 41 faces gear tooth 1a. The resistance of first MRE 41 is high at the gear tooth position and low at the gear base position, and varies slowly at the transient position. Second MRE 42 exactly detects the position of tooth side surface 1c in the same manner as in the first embodiment. Therefore, the second embodiment detects the gear position even gear 1 is not rotated in the same manner as in the first embodiment.

Figure 9A:
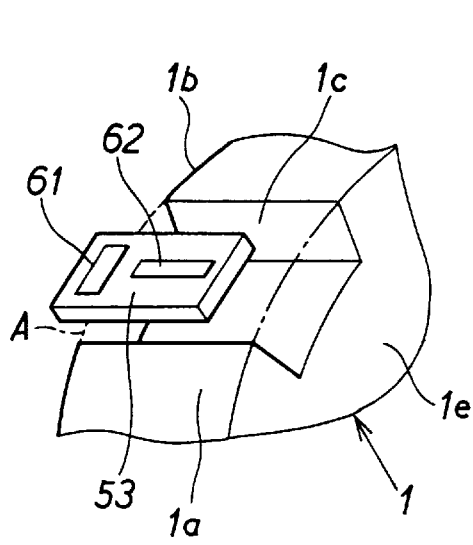
FIG. 9A is a fragmentary perspective view showing a rotation detector as a third embodiment according to the present invention.
Figure 9B:
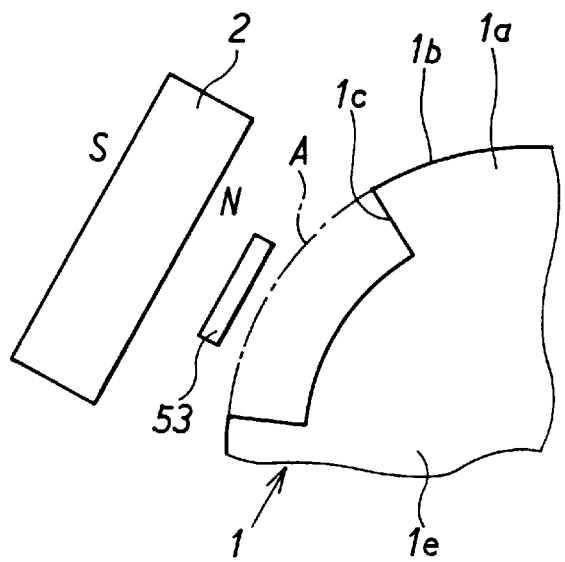
FIG. 9B is a fragmentary plan view showing the third embodiment.
Figure 10:
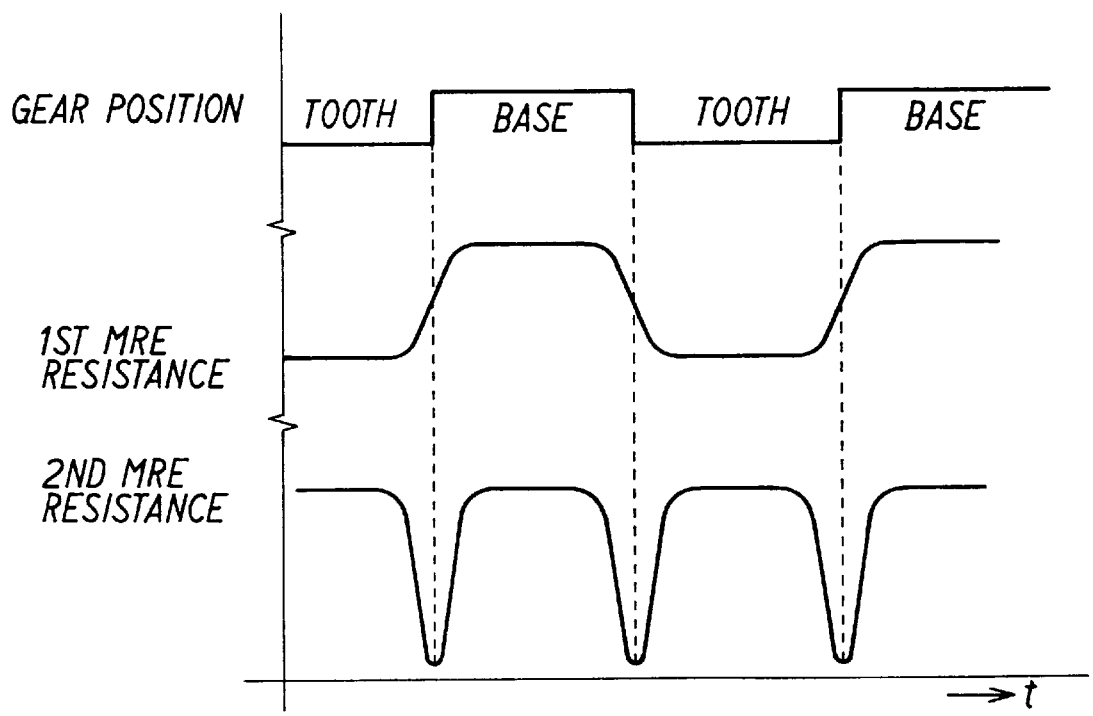
FIG. 10 is a time chart showing values of electric resistance of magnetoresistance elements used in the third embodiment.
Figure 11A:
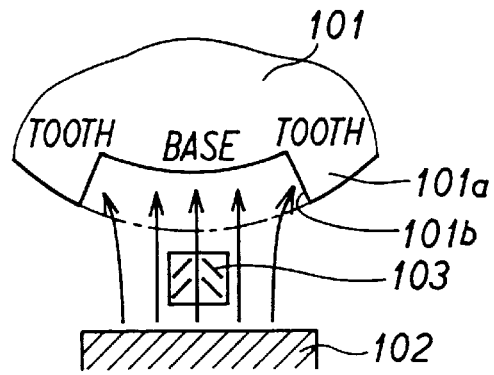
FIGS. 11A and 11B are schematic views showing magnetic field directions in a conventional detector.
Figure 11B:
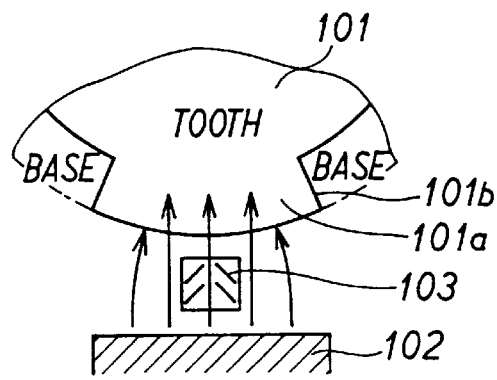
Figure 12:
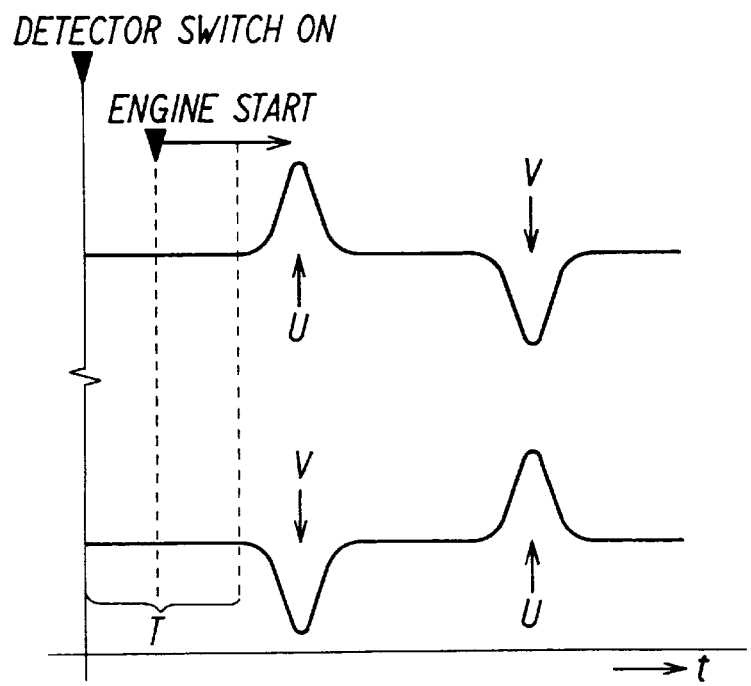
FIG. 12 is a time chart showing output waveforms of the conventional detector shown in FIGS. 11A and 11B.

Referring to FIGS. 9A, 9B and 10, a third embodiment according to the present invention will be described. In this embodiment, IC chip 53 having first MRE 61 and second MRE 62 is disposed at a peripheral vicinity of gear 1 (a radial outside of gear 1), as opposed to the arrangement of the first embodiment in which the IC chip is disposed at an axial vicinity of gear 1. Bias magnet 2 is also disposed at a radial outside of gear 1 so that the magnetic field generated by bias magnet 2 is directed toward IC chip 53 and gear 1. Other structures are the same as those of the first embodiment. Since first MRE 61 is positioned just outside of outer circle A as shown in FIG. 9A, the resistance thereof varies in the same manner as in the first embodiment (shown in FIG. 10). Second MRE 62 is positioned in parallel to the axial direction of gear 1, and its resistance varies as shown in FIG. 10. First MRE 61 detects whether it faces gear tooth 1a or gear base 1f by detecting peripheral edge 1b of gear 1, and second MRE 62 exactly detects the transient position of gear tooth 1a and gear base 1f by detecting side surface 1c of gear 1, in the same manner as in the first embodiment.

In all the embodiments described above, the first MRE detects the position of the gear tooth even the gear is not rotated, and the second MRE exactly detects the gear side surface once the gear is rotated. Thus, the gear angle is exactly detected, and accordingly the first cylinder to be fired is determined without fail.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A rotation detector for detecting an angular position of a gear made of a magnetic material having a plurality of gear teeth and a plurality of gear bases, alternately formed on a periphery of the gear at equal intervals, and side surfaces, each gear tooth having an outer peripheral edge and each gear base being formed along a inner base circle, the rotation detector comprising:
   a bias magnet for generating a magnetic field in a direction toward the gear;
   a first magnetoresistance element for generating a signal representing the angular position of the gear teeth, the first magnetoresistance element being placed at a position where the direction of the magnetic field is varied according to the angular position of the gear teeth; and
   a signal processing circuit for processing the signal to detect the angular position of the gear, even when the gear is not rotating, and wherein:
   the first magnetoresistance element is elongated so as to define a longitudinal axis thereof and positioned at a peripheral outside vicinity of the outer peripheral edge of the gear at an axial side of the side surface of the gear so that said longitudinal axis of said first magnetoresistance lies generally parallel to a tangent to the outer peripheral edge of the gear; and
   electric current is supplied to the first magnetoresistance element, and flows in a direction of said longitudinal axis of said first magnetoresistance element.

2. The rotation detector as in claim 1, further comprising a second magnetoresistance element for generating a signal representing a transitional position from the gear tooth to the gear base.

3. The rotation detector as in claim 2, wherein:
   the signal processing circuit includes a first circuit for comparing the signal of the first magnetoresistance element with a first threshold value to generate a first output, a second circuit for comparing the signal of the second magnetoresistance element with a second threshold value to generate a second output, and a third circuit for detecting the angular position of the gear by sampling the first output at instances when the second output changes its level.

4. The rotation detector as in claim 2, wherein the second magnetoresistance element is elongated so as to define a longitudinal axis thereof and positioned radially inside of the first magnetoresistance element with respect to a radial center of the gear.

5. A rotation detector for detecting an angular position of a gear made of a magnetic material having a plurality of gear teeth and a plurality of gear bases, alternately formed on a periphery of the gear at equal intervals, and side surfaces, each gear tooth having an outer peripheral edge and each gear base being formed along a inner base circle, the rotation detector comprising:
   a bias magnet for generating a magnetic field in a direction toward the gear;
   a first magnetoresistance element for generating a signal representing the angular position of the gear teeth, the first magnetoresistance element being placed at a position where the direction of the magnetic field is varied according to the angular position of the gear teeth; and
   a signal processing circuit for processing the signal to detect the angular position of the gear, even when the gear is not rotating, wherein:
   the first magnetoresistance element is elongated so as to define a longitudinal axis thereof and positioned at a peripheral outside vicinity of the inner base circle of the gear at an axial side of the side surface of the gear so that said longitudinal axis thereof lies generally parallel to a tangent to the inner base circle; and
   electric current is supplied to the first magnetoresistance element, and flows in a direction of said longitudinal axis of said first magnetoresistance element.

6. The rotation detector as in claim 5, further comprising a second magnetoresistance element for generating a signal representing a transitional position from the gear tooth to the gear base.

7. The rotation detector as in claim 6, wherein the second magnetoresistance element is elongated so as to define a longitudinal axis thereof and positioned radially outside of the first magnetoresistance element with respect to a radial center of the gear.

8. The rotation detector as in claim 7, wherein
   the second magnetoresistance element is positioned so that said longitudinal axis of said second magnetoresistance element is disposed perpendicularly to the longitudinal axis of said first magnetoresistance element; and
   electric current is supplied to the second magnetoresistance element, and flows in a direction of said longitudinal axis of said second magnetoresistance element.

9. A rotation detector for detecting an angular position of a gear made of a magnetic material having a plurality of gear teeth and a plurality of gear bases, alternately formed on a periphery of the gear at equal intervals, and side surfaces, each gear tooth having an outer peripheral edge and each gear base being formed along a inner base circle, the rotation detector comprising:
   a bias magnet for generating a magnetic field in a direction toward the gear;
   a first magnetoresistance element for generating a signal representing the angular position of the gear teeth, the first magnetoresistance element being placed at a position where the direction of the magnetic field is varied according to the angular position of the gear teeth;
   a signal processing circuit for processing the signal to detect the angular position of the gear; and
   a second magnetoresistance element for generating a signal representing a transitional position from the gear tooth to the gear base, wherein
   the first magnetoresistance element is elongated so as to define a longitudinal axis thereof and positioned at a peripheral outside vicinity of the outer peripheral edge of the gear at an axial side of the side surface of the gear so that said longitudinal axis thereof lies generally parallel to a tangent to the outer peripheral edge;
   electric current is supplied to the first magnetoresistance element, and flows in a direction of said longitudinal axis of said first magnetoresistance element;
   the second magnetoresistance element is elongated so as to define a longitudinal axis thereof and positioned radially inside of the first magnetoresistance element with respect to a radial center of the gear and so that said longitudinal axis of said second magnetoresistance element is disposed perpendicularly to the longitudinal axis of said first magnetoresistance element; and
   electric current is supplied to the second magnetoresistance element, and flows in a direction of said longitudinal axis of said second magnetoresistance element.

* * * * *